US011155899B2

(12) United States Patent
Hutchison et al.

(10) Patent No.: US 11,155,899 B2
(45) Date of Patent: Oct. 26, 2021

(54) ANTIMICROBIAL, HYPOALLERGENIC, AND TARNISH-RESISTANT CU-BASED ALLOY AND RELATED METHODS THEREOF

(71) Applicant: University of Virginia Patent Foundation, Charlottesville, VA (US)

(72) Inventors: Michael J. Hutchison, Charlottesville, VA (US); John R. Scully, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 0 days.

(21) Appl. No.: 16/385,734

(22) Filed: Apr. 16, 2019

(65) Prior Publication Data

US 2019/0316228 A1    Oct. 17, 2019

Related U.S. Application Data

(60) Provisional application No. 62/658,037, filed on Apr. 16, 2018, provisional application No. 62/770,461, filed on Nov. 21, 2018.

(51) Int. Cl.
| | | |
|---|---|---|
| *C22C 9/01* | (2006.01) | |
| *C22C 9/02* | (2006.01) | |
| *A01N 59/16* | (2006.01) | |
| *A01N 59/06* | (2006.01) | |
| *A01N 59/20* | (2006.01) | |

(52) U.S. Cl.
CPC ............ *C22C 9/01* (2013.01); *A01N 59/06* (2013.01); *A01N 59/16* (2013.01); *A01N 59/20* (2013.01); *C22C 9/02* (2013.01)

(58) Field of Classification Search
None
See application file for complete search history.

(56) References Cited

U.S. PATENT DOCUMENTS

| | | | | |
|---|---|---|---|---|
| 5,147,686 A | * | 9/1992 | Ichimura | A01N 59/16 106/18.36 |
| 2006/0016528 A1 | * | 1/2006 | Hatakeyama | C22C 9/02 148/684 |
| 2007/0254189 A1 | * | 11/2007 | Nakagawa | G11B 5/11 428/828.1 |

FOREIGN PATENT DOCUMENTS

DE            3235833 A1 *   3/1984   ............... C22C 9/01

OTHER PUBLICATIONS

Derwent English abstract for DE 32 35 833 A1. (Year: 1984).*
Machine-assisted English translation for DE 32 35 833 A1. (Year: 1984).*
Lerner et al ("The effect of tin on the susceptibility of a Cu—Al alloy to cracking in mercury", Materials Science and Engineering A345 (2003) p. 357-358) (Year: 2003).*
Michels et al., "Copper alloys—The new weapon in the fight against infectious disease," Current Trends in Microbiology, vol. 10, pp. 1-24 (2016).
Villapun et al., "Antibacterial Metallic Touch Surfaces," Materials, vol. 9, No. 736, pp. 1-23 (2016).
O'Neill, "Antimicrobial Resistance: Tackling a crisis for the health and wealth of nations," Review on Antimicrobial Resistance, pp. 1-20 (2014).
Michels et al., "Antimicrobial Properties of Copper Alloy Surfaces, with a Focus on Hospital-Acquired Infections," International Journal of Metalcasting, vol. 2, Issue 3, pp. 1-12 (2008).
Miettinen, "Thermodynamic Description of the Cu—Al—Sn System in the Copper-Rich Corner," Metallurgical and Materials Transactions A, vol. 33A, pp. 1639-1648 (Jun. 2002).
Wojtas et al., "Electrochemical Characterization of New Stainless Cu—Al—Sn Alloys," Corrosion Science, vol. 37, No. 5, pp. 793-799 (1995).
Virtanen et al., "Passivity of High Corrosion Resistant Cu—Al—Sn Alloys," J. Electrochem. Soc., vol. 140, No. 10, pp. 2786-2790 (Oct. 1993).
Yu et al., "Nonequilibrium Solute Capture in Passivating Oxide Films," Physical Review Letters, vol. 121, pp. 1-7(2018).
Hutchison et al., "Enhanced Electrochemical Cu Release from Commercial Cu—Sn Alloys: Fate of the Alloying Elements in Artificial Perspiration," Electrochimica Acta, vol. 241, pp. 1-16 (2017).
Foster et al., "The Fate of Copper During Corrosion of Cu—5Zn—5Al—1Sn (89% Cu, 5% Zn, 5% Al, 1% Sn) Compared to Copper in Synthetic Perspiration Solution," Corrosion, vol. 72, No. 1, pp. 51-65 (Jan. 2016).
Airey et al., "Potential use of copper as a hygienic surface; problems associated with cumulative soiling and cleaning," Journal of Hospital Infection, vol. 67, pp. 271-277 (2007).
Castle et al., "A more general method for ranking the enrichment of alloying elements in passivation films," Surf. Interface Anal., vol. 36, pp. 220-224 (2004).
Wright et al., "Theory of the copper vacancy in cuprous oxide," Journal of Applied Physics, vol. 92, pp. 1-4 (2002).

(Continued)

*Primary Examiner* — Sin J Lee
(74) *Attorney, Agent, or Firm* — Jenkins, Wilson, Taylor & Hunt, P.A.

(57) ABSTRACT

Described herein are ternary alloys of copper (Cu), aluminum (Al) and tin (Sn). For example, the ternary alloys can comprise between about 0.5 weight percent (wt %) and about 5 wt % Al and between about 0.5 wt % and about 5 wt % Sn. The chemical composition of the alloys can be tailored such that the alloy maintains antimicrobial effect over time and is resistant to tarnish. The alloys are also hypoallergenic. Articles of manufacture, particularly those for use in medical facilities, comprising the alloy (e.g., as a surface layer) are also described, as are methods of reducing the incidence of microbial infection by providing surfaces comprising the alloy.

11 Claims, 6 Drawing Sheets
(1 of 6 Drawing Sheet(s) Filed in Color)

(56) References Cited

OTHER PUBLICATIONS

Lin et al., "Individual and Combined Effects of Copper and Silver Ions on Inactivation of Legionella Pneumophila," Wat. Res., vol. 30, No. 8, pp. 1905-1913 (1996).
Kirchheim et al., "The Passivity of Iron-Chromium Alloys," Corrosion Science, vol. 29, No. 7, pp. 899-917 (1989).

* cited by examiner

ANTIMICROBIAL, HYPOALLERGENIC, AND TARNISH-RESISTANT CU-BASED ALLOY AND RELATED METHODS THEREOF

RELATED APPLICATIONS

The presently disclosed subject matter claims the benefit of U.S. Provisional Patent Application Ser. No. 62/658,037, filed Apr. 16, 2018, and U.S. Provisional Patent Application Ser. No. 62/770,461, filed Nov. 21, 2018, the disclosures of each of which are incorporated herein by reference in their entireties.

STATEMENT OF GOVERNMENT SUPPORT

This invention was made with government support under Grant No. DMR 1309999 awarded by the National Science Foundation. The government has certain rights in the invention.

TECHNICAL FIELD

The presently disclosed subject matter relates to ternary copper alloys comprising aluminum and tin that are antimicrobial, tarnish-resistant, and hypoallergenic. The presently disclosed subject matter further relates to articles of manufacture comprising the ternary copper alloys and to methods of reducing the incidence of microbial infection by providing a surface comprising a ternary copper alloy.

ABBREVIATIONS

%=percent  
° C.=degrees Celsius  
μA=microampere  
μm=micrometer  
A=ampere  
Al=aluminum  
CFU=colony forming unit  
cm=centimeter  
Coul=coulomb  
Cu=copper  
fcc=face-centered cubic  
h=hours  
HER=hydrogen evolution reaction  
LOD=limits of detection  
mC=millicoulomb  
mg=milligrams  
mL=milliliter  
MMSE=mercury/mercurous sulfate electrode  
MPN=most-probable number  
MRSA=methicillin-resistance *Staphylococcus areus*  
Ni=nickel  
s=seconds  
SCE=saturated calomel electrode  
Sn=tin  
V=volt  
wt=weight  
Zn=zinc

BACKGROUND

Microbes, e.g., bacteria, fungi, viruses and spores, are readily deposited on hard surfaces. The presence of small amounts of moisture on such surfaces promotes microbe growth. Human or any host contact with such surfaces provides a transmission vehicle for the microbes leading to further deposition, growth, transmission, and, in many cases, human infection. Currently, there exists a large variety of strains of antibiotic resistant virulent microbes. These microbes cause diseases such as, e.g., methicillin-resistant *Staphylococcus Aureus* (MRSA), that, if left untreated, can lead to sickness and even death. This problem is especially prevalent in public settings, e.g., hospitals, schools, nursing homes, and the like, where virulent microbes can easily spread among larger numbers of people. Thus, there is a need to frequently sanitize and/or disinfect surfaces that people touch in many environments including schools, hotels, hospitals and other medical facilities, places of work, and the like.

There are several types of antimicrobial agents. However, chemical antimicrobial agents (e.g., disinfectants) that can be used to treat high touch surfaces are often harmful to both the environment and to individuals coming into contact with them. Also, many chemical antimicrobial agents can lose their antimicrobial activity within a short time period and need to be reapplied time and time again.

An alternative to such agents is a specialty surface already having antimicrobial properties and which is ideally able to maintain its intrinsic antimicrobial properties for long periods of time. For example, many copper alloys are believed to provide an antimicrobial effect against human pathogens, such as, but not limited to *E. coli* 0157, *Listeria monocytogenes, Salmonella*, and MRSA. However, although copper can impart many useful properties to copper-based alloys, copper and high copper alloys are often susceptible to tarnish. Exposed copper or copper alloy surfaces can discolor and develop a patina. This often provides an undesirable visual characteristic, particularly in health care and food service institutions, where tarnished surfaces would appear unattractive and unclean. In addition, some copper alloys use metals, such as nickel, that can promote an allergenic response on contact.

Accordingly, there is an ongoing need for additional antimicrobial copper alloy compositions. For instance, there is an ongoing need for additional antimicrobial copper alloys that are tarnish-resistant and/or hypoallergenic. There is also an ongoing need for additional copper alloys that can maintain their antimicrobial effects over time and/or in high touch environments.

SUMMARY

In some embodiments, the presently disclosed subject matter provides a copper (Cu) alloy comprising between about 0.5 weight percent (wt %) and about 5 wt % aluminum (Al), and between about 0.5 wt % and about 5 wt % tin (Sn), and the remainder copper and unavoidable impurities, wherein said Cu alloy is antimicrobial, tarnish-resistant and hypoallergenic. In some embodiments, the Cu alloy is a monophasic solid solution having a face-centered cubic (fcc) lattice structure.

In some embodiments, the Cu alloy is tarnish-resistant under exposure to artificial perspiration for one week or more. In some embodiments, the surface of the Cu alloy has an optically transparent oxide layer that has a thickness of about 0.5 micrometer or less under exposure to artificial perspiration for one week or more. In some embodiments, the Cu alloy has an optically transparent oxide layer that has a thickness of about 0.2 micrometer or less under exposure to artificial perspiration for one week or more.

In some embodiments, a surface of the Cu alloy has a corrosion current density in artificial perspiration greater than about 0.1 microampere per square centimeter ($\mu A/cm^2$) at 0 volts (V) versus a saturated calomel reference electrode. In some embodiments, the current density is measured after exposure of the alloy to artificial perspiration.

In some embodiments, release of Cu cations from the Cu alloy is continuous for at least one week or more. In some embodiments, the Cu cation release is continuous in the presence of perspiration. In some embodiments, an amount of soluble Cu cations in an aqueous solution in contact with an about 1.1 $cm^2$ surface of the alloy for about 96 hours is about 0.8 parts-per-million (ppm) or more. In some embodiments, the aqueous solution is artificial perspiration with a volume of 200 mL or less.

In some embodiments, a 1.1 $cm^2$ surface of the Cu alloy has about a 100% killing efficiency for E. coli after 24 hours wherein the surface is contacted with about $2\times10^6$ colony forming units (CFU) of E. coli in the presence of an aerated solution of artificial perspiration with a volume of 200 mL or less.

In some embodiments, the Cu alloy comprises between about 1 wt % Sn and about 5 wt % Sn and between about 1 wt % Al and about 4.5 wt % Al. In some embodiments, the Cu alloy is selected from the group consisting of Cu-1 wt % Al-1 wt % Sn, Cu-1 wt % Al-5 wt % Sn, and Cu-5 wt % Al-1 wt % Sn.

In some embodiments, the presently disclosed subject matter provides an article of manufacture comprising the Cu alloy comprising between about 0.5 weight percent (wt %) and about 5 wt % aluminum (Al), and between about 0.5 wt % and about 5 wt % tin (Sn), and the remainder copper and unavoidable impurities, wherein said Cu alloy is antimicrobial, tarnish-resistant and hypoallergenic. In some embodiments, said article of manufacture is selected from the group comprising a medical, veterinary, or dental device; medical facility furniture; a hand railing, a door or window handle or fitting; a tray table; a hospital room call button; a chair or sofa; a wheel chair; a walker; a cane or crutch; automatic door push plates; toilet safety rails; carts; sinks, sink handles; drain control levers; paper towel holders; push buttons on air hand dryers; drawer knobs, shower or bathtub grab bars; towel bars; toilet hardware; light switches; switch plates; thermostat covers and controls; telephone handsets; instrument handles; food trays; instrument trays; bedpans; exercise equipment; physical therapy equipment; medical chart holders; laundry hampers; television controls; a computer mouse; a computer keyboard; a personal digital assistant; toothbrush holders; pens; ATM machines; gym lockers; elevator handrails or control buttons; soap holders; soap dispensers; toilet paper dispensers; bracelets; water fountain knobs and/or buttons; kitchen cabinet door handles; microwave handles; refrigerator handles; stove top control buttons; play area equipment; smart phone covers; and vending machines.

In some embodiments, the presently disclosed subject matter provides a method of reducing the incidence of microbial infection, the method comprising providing a surface comprising a copper (Cu) alloy, wherein said Cu alloy is antimicrobial, tarnish-resistant and hypoallergenic, further wherein said Cu alloy comprises copper, between about 0.5 weight percent (wt %) and about 5 wt % aluminum (Al), and between about 0.5 wt % and about 5 wt % tin (Sn), and is free of nickel (Ni) and zinc (Zn). In some embodiments, the Cu alloy is a monophasic solid solution having a face-centered cubic (fcc) lattice structure.

In some embodiments, the Cu alloy is tarnish-resistant under exposure to artificial perspiration for one week or more. In some embodiments, the surface of the Cu alloy has an optically transparent oxide layer that has a thickness of about 0.5 micrometer or less under exposure to artificial perspiration for one week or more. In some embodiments, the Cu alloy has an optically transparent oxide layer that has a thickness of about 0.2 micrometer or less under exposure to artificial perspiration for one week or more.

In some embodiments, a surface of the Cu alloy has a corrosion current density in artificial perspiration greater than about 0.1 microampere per square centimeter ($\mu A/cm^2$) at 0 volts (V) versus a saturated calomel reference electrode. In some embodiments, the current density is measured after exposure of the alloy to artificial perspiration. In some embodiments, release of Cu cations from the Cu alloy is continuous for at least one week or more. In some embodiments, the release is continuous in the presence of perspiration.

In some embodiments, a 1.1 $cm^2$ surface of the Cu alloy has about a 100% killing efficiency for E. coli after 24 hours when said surface is contacted with about $2\times10^6$ colony forming units (CFU) of E. coli in the presence of an aerated solution of artificial perspiration with a volume of 200 mL or less.

In some embodiments, the Cu alloy comprises between about 1 wt % Sn and about 5 wt % Sn and between about 1 wt % Al and about 4.5 wt % Al. In some embodiments, the Cu alloy is selected from the group consisting of Cu-1 wt % Al-1 wt % Sn, Cu-1 wt % Al-5 wt % Sn, and Cu-5 wt % Al-1 wt % Sn.

In some embodiments, the providing comprises adding a coating layer comprising the Cu alloy to a surface present in a public space. In some embodiments, the public space is a medical facility or a space associated with public transportation. In some embodiments, the public space is a hospital or urgent-care facility.

In some embodiments, the providing comprises providing a piece of furniture, a hand railing, a room fitting, or a medical, veterinary, or dental device comprising the Cu alloy. In some embodiments, the surface is part of an article selected from the group comprising a medical, veterinary, or dental device; medical facility furniture; a hand railing, a door or window handle or fitting; a tray table; a hospital room call button; a chair or sofa; a wheel chair; a walker; a cane or crutch; automatic door push plates; toilet safety rails; carts; sinks, sink handles; drain control levers; paper towel holders; push buttons on air hand dryers; drawer knobs, shower or bathtub grab bars; towel bars; toilet hardware; light switches; switch plates; thermostat covers and controls; telephone handsets; instrument handles; food trays; instrument trays; bedpans; exercise equipment; physical therapy equipment; medical chart holders; laundry hampers; television controls; a computer mouse; a computer keyboard; a personal digital assistant; toothbrush holders; pens; ATM machines; gym lockers; elevator handrails or control buttons; soap holders; soap dispensers; toilet paper dispensers; bracelets; water fountain knobs and/or buttons; kitchen cabinet door handles; microwave handles; refrigerator handles; stove top control buttons; play area equipment; smart phone covers; and vending machines.

Accordingly, it is an object of the presently disclosed subject matter to provide an antimicrobial, tarnish-resistant and hypoallergenic copper alloy or an article of manufacture comprising the alloy, as well as methods of reducing the incidence of microbial infection by providing a surface comprising the alloy.

These and other objects are achieved in whole or in part in the presently disclosed subject matter. An object of the presently disclosed subject matter having been stated above, other objects and advantages will become apparent upon a review of the following descriptions, examples, and figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 is graph showing the antimicrobial effectiveness of copper and exemplary copper alloys. More particularly, the graph shows *Escherichia coli* (*E. coli*) survivability when exposed to a 1.1 square centimeter ($cm^2$) surface of copper or copper alloy in 200 milliliters (mL) of artificial perspiration. Sample aliquots of the liquid in contact with the copper or copper alloy were taken at the intervals indicated by the x-axis and quantified by the most-probably number (MPN) method as the *E. coli* concentration per 100 mL. Data is provided for a sample comprising 99.8 weight percent (wt %) copper (99.8 Cu, unfilled squares), a ternary copper alloy comprising copper (Cu), 5 wt % aluminum (Al) and 5 wt % tin (Sn) (i.e., Cu-5Al-5Sn, filled black squares), a ternary copper alloy comprising Cu, 5 wt % Al and 1 wt % Sn (i.e., Cu-5Al-1Sn, unfilled triangles), a ternary copper alloy comprising Cu, 1 wt % Al, and 5 wt % Sn (i.e., Cu-1Al-5Sn, filled grey squares), and a ternary copper alloy comprising Cu, 1 wt % Al and 1 wt % Sn (i.e., Cu-1Al-1Sn, unfilled triangles). Control (unfilled circles) represents survivability of *E. coli* in the absence of any antimicrobial agent.

FIG. 3A is a graph showing the electrochemical reduction chronopotential plots (reduction potential (versus a mercury/mercurous sulfate electrode (MMSE)) versus time (in seconds (s))) of surface oxides of copper (Cu) or exemplary Cu alloys grown at open circuit in artificial perspiration. HER refers to the completion of the reduction, terminating in the electrolysis of the electrolyte by the hydrogen evolution reaction (HER) in deareated borate buffer at pH 8.4. Data is provided for surface oxides of 99.8 weight % (wt %) Cu, a ternary alloy comprising Cu, 1 wt % aluminum (Al) and 1 wt % tin (Sn) (i.e., Cu-1Al-1Sn), a ternary alloy comprising Cu, 1 wt % Al and 5 wt % Sn (i.e., Cu-1Al-5Sn), a ternary alloy comprising Cu, 5 wt % Al and 1 wt % Sn (i.e., Cu-5Al-1Sn), and a ternary alloy comprising Cu, 5 wt % Al, and 5 wt % Sn (i.e., Cu-5Al-5Sn).

DETAILED DESCRIPTION

The presently disclosed subject matter will now be described more fully hereinafter with reference to the accompanying Examples, in which representative embodiments are shown. The presently disclosed subject matter can, however, be embodied in different forms and should not be construed as limited to the embodiments set forth herein. Rather, these embodiments are provided so that this disclosure will be thorough and complete, and will fully convey the scope of the embodiments to those skilled in the art.

Unless otherwise defined, all technical and scientific terms used herein have the same meaning as commonly understood by one of ordinary skill in the art to which this presently described subject matter belongs. Although any methods, devices, and materials similar or equivalent to those described herein can be used in the practice or testing of the presently disclosed subject matter, representative methods, devices, and materials are now described. All publications, patent applications, patents, and other references mentioned herein are incorporated by reference in their entirety.

I. Definitions

While the following terms are believed to be well understood by one of ordinary skill in the art, the following definitions are set forth to facilitate explanation of the presently disclosed subject matter.

Following long-standing patent law convention, the terms "a", "an", and "the" refer to "one or more" when used in this application, including the claims. Thus, for example, reference to "an alloy" includes a plurality of such alloys, and so forth.

Unless otherwise indicated, all numbers expressing quantities of size, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about", when referring to a value or to an amount of size, thickness, weight, concentration, time, current density, or percentage is meant to encompass variations of in one example ±20% or ±10%, in another example ±5%, in another example ±1%, and in still another example ±0.1% from the specified amount, as such variations are appropriate to perform the disclosed methods.

Numerical ranges recited herein by endpoints include all numbers and fractions subsumed within that range (e.g. 1 to 5 includes, but is not limited to, 1, 1.5, 2, 2.75, 3, 3.90, 4, and 5). Similarly, numerical ranges recited herein by endpoints include subranges subsumed within that range (e.g. 1 to 5 includes 1-1.5, 1.5-2, 2-2.75, 2.75-3, 3-3.90, 3.90-4, 4-4.24, 4.24-5, 2-5, 3-5, 1-4, and 2-4).

As used herein, the term "and/or" when used in the context of a listing of entities, refers to the entities being present singly or in combination. Thus, for example, the phrase "A, B, C, and/or D" includes A, B, C, and D individually, but also includes any and all combinations and sub-combinations of A, B, C, and D.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" can mean at least a second or more.

The term "comprising", which is synonymous with "including," "containing," or "characterized by" is inclusive or open-ended and does not exclude additional, unrecited elements or method steps. "Comprising" is a term of art used in claim language which means that the named elements are present, but other elements can be added and still form a construct or method within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

The term "unavoidable impurities" as used herein refers to impurities in metal products in general, which are present in a raw material or inevitably mixed in a production step. These impurities are unnecessary and are present in amounts low enough to not affect the characteristics of the desired metal alloy. Further, the total amount of the unavoidable impurities is generally 50 ppm or less, typically 30 ppm or less, more typically 10 ppm or less.

The term "tarnish-resistant" as used herein refers to a composition (e.g., a metal or metal alloy) having a surface that does not appear tarnished (or that appears less tarnished than a similar material) upon visual inspection over a period of hours, days or weeks (e.g., about 1 day, 2 days, 3 days, 4 days, 5 days, 6 days, one week, or two weeks or more). Thus, with regard to the presently disclosed Cu alloys, the term tarnish-resistant can refer to an alloy that has a surface that maintains a Cu color that is visually free or relatively free of dark discolorations and/or a brown appearance (e.g., in comparison to the corrosion behavior of non-alloyed Cu). In some embodiments, the tarnish-resistance is tarnish resistance under exposure to a particular environment, such as when the alloy is exposed to artificial perspiration to stimulate ambient conditions for high-touch surfaces. The term "tarnish-resistant" is not intended herein to refer to a material that has a surface that is free of all oxides, but rather refers to a material wherein any surface oxide layer or layers generally remain optically transparent and/or relatively thin (e.g., about 0.5 micrometers or less, about 0.4 micrometers or less, about 0.3 micrometers or less, about 0.2 micrometers or less, about 0.15 micrometers or less, about 0.1 micrometers or less).

The term "antimicrobial" as used herein refers to the ability to kill microorganisms (e.g., bacteria, fungi, parasites, viruses, and/or spores) or to inhibit their growth. Antimicrobial includes antibacterial, antifungal, antiviral, and antiparasitic. In some embodiments, the presently disclosed antimicrobial compositions are effective in killing gram negative and gram positive bacteria, fungi, parasites, non-enveloped and enveloped viruses. In some embodiments, the antimicrobial composition has rapid and/or long lasting antimicrobial efficacy against bacteria such as *Mycobacterium tuberculosis*, *Staphylococcus aureus*, methicillin-resistant *S. aureus*, *Escherichia coli*, *Pseudomonas aeruginosa*, *Serratia marcescens*, *Mycobacterium bovis*, and *Salmonella enterica*; viruses such as Adenovirus, Hepatitis C, and Rotavirus, fungi such as *Candida albicans*, *Trichophyton interdigitale*, and *Aspergillus niger*, and black mold spores *Stachybotrys chartani*. In some embodiments, "antimicrobial" refers to a composition that maintains ability to kill and/or prevent the growth of microorganisms for more than 1 day, more than 2 days, more than 3 days, more than 4 days, more than 5 days, more than 6 days, more than 7 days, more than two weeks, more than 3 weeks, or more than a month under ambient conditions or under conditions wherein the composition is in contact with perspiration. In some embodiments, the presently disclosed antimicrobial compositions can prevent the spread of diseases caused by microbial pathogens, such as, but not limited to, tuberculosis, listeriosis, leprosy, diphtheria, bacterial meningitis, bacterial pneumonia, bacterial gastroenteritis, and skin infections, such as, but not limited to, acne, erysipelas, cellulitis, and impetigo.

Examples of gram-positive bacteria include, but are not limited to, *Clostridium difficile*, *Clostridium perfringens*-vegetative cells, *Clostridium sporogenes*-vegetative cells, *Enterococcus faecalis*-vancomycin resistant (VRE), *Enterococcus faecium*, *Listeria monocytogenes*, *Micrococcus luteus*, *Mycobacterium smegmatis*, *Staphylococcus aureus*, *Staphylococcus aureus*-methicillin resistant (MRSA), *Staphylococcus aureus*-vancomicyn resistant (VRSA),

*Staphylococcus epidermidis, Staphylococcus haemolyticus, Staphylococcus hominis, Staphylococcus saprophyticus, Streptococcus agalactiae, Streptococcus pneumonia, Streptococcus pneumoniae*-Drug Resistant, *Streptococcus pyogenes, Streptococcus*-Group A-Erythromycin-resistant, *Streptococcus*-Group B-Clindamycin-resistant and *Pseudomonas aeruginosa, Streptococcus pyogenes* and/or *Streptococcus faecalis*.

Examples of gram-negative bacteria include *Acinetobacter baumannii, Acinetobacter*-multi drug resistant, *Bacteroides fragilis, Bordetella pertussis, Burkholderia cepacia, Camplylobacter* species, *Camplylobacter*-drug resistant, *Enterobacter aerogenes*, Enterobacteriaceae (ESBLs), Enterobacteriaceae-carbapenem-resistant, *Escherichia coli* (*E. coli*), drug-resistant *E. coli, Haemophilus influenza, Helicobacter pylori, Klebsiella oxytoca, Klebsiella pneumoniae, Neisseria gonorrhoeae, Neisseria gonorrhoeae*-drug resistant, *Neisseria meningitides, Proteus mirabilis, Pseudomonas aeruginosa, Pseudomonas aeruginosa*—multi drug resistant, *Salmonella*-non-typhoidal-drug resistant, *Salmonella typhi, Salmonella typhi*-drug resistant, *Serratia marcescens, Shigella sonnei, Shigella*-drug-resistant, and *Vibrio cholerae*.

The term "hypoallergenic" as used herein refers to a copper alloy composition that is unlikely to cause an allergic reaction or less likely to cause an allergic reaction than other copper alloy compositions, such as copper alloy compositions comprising nickel (Ni).

II. General Considerations

Many copper alloys have demonstrated the ability to be antimicrobial surfaces. See Michels et al., Int. J. Met. 2(3) (2008) 47-56; and Airey and Verran, J. Host. Infect. 67(3) (2010) 271-277. This effect is strong enough to eliminate even antibiotic-resistant strains such as Methicillin-resistant *Staphylococcus aureus* (MRSA). Active ongoing corrosion is required to maintain this continuous action as dissolved Cu metal ions are responsible for antimicrobial function. See Foster et al., Corrosion. 72 (2016) 51-65; and Lin et al., Water Res. 30 (1996) 1905-1913. [5,6]. However, continuous active corrosion can result in corrosion products or oxides which tarnish the surface. Tarnish-free copper alloys are usually too corrosion-resistant to maintain antimicrobial function (see Foster et al., Corrosion. 72 (2016) 51-65), forming a passive layer which deactivates sufficient corrosive release of copper ions. This loss of antimicrobial effect has been demonstrated by MRSA survivability on a commercially available tarnish-resistant alloy. In particular, while an exemplary commercially available tarnish-free copper alloy, i.e., "Nordic Gold", which contains 5 wt % zinc (Zn), 5 wt % aluminum (Al), and 1 wt % Sn, is capable of antimicrobial activity toward MRSA when freshly polished, antimicrobial activity is lost over the course of seven days when the Nordic Gold is exposed to ambient laboratory conditions.

Accordingly, the commonly held belief in the field that 65 wt % or greater Cu in a Cu alloy is sufficient for antimicrobial function (see Michels and Michels, Curr. Trends Microbiology. 10 (2016) 23-45) is not always sufficient in practice, as passivity can shut down the corrosion that is required to provide cytotoxic copper ions in some alloys despite >65% Cu alloying. Furthermore, prior studies regarding antimicrobial copper alloys have generally not investigated the antimicrobial ability of Cu alloys in a simulative environment where pathogenic bacteria proliferate. Bacterial infections transfer from hand-to-surface then back to hand when touched by another person. The environment most likely to simulate this contact is artificial perspiration (palm sweat).

In some embodiments, the presently disclosed subject matter provides a Cu alloy having a balance between corrosion and tarnish-resistance through strict metallurgical chemical and crystal structure control. The particular chemical compositions providing this balance would not have been expected prior to the presently disclosed subject matter. Elemental additions to copper demonstrate non-intuitive responses to corrosion and cation release, making the particular compositions that combine antimicrobial effect and tarnish-resistance difficult to predict. For example, although adding Al and Sn can increase tarnishing at minor amounts, according to the presently disclosed subject matter it has been found that increasing Sn from 1 to 5 wt % in a Cu alloy also comprising about 5 wt % Al can unexpectedly lead to a decrease in the thickness of thin oxide surface layers, suggesting a synergistic effect. More particularly, while Al and Sn are known individually to form protective oxide films when alloyed with copper, their combination in particular amounts as presented herein results in an alloy with properties that could not have been predicted prior to the presently disclosed subject matter. Tarnish-resistance is maintained in the presently disclosed alloys, albeit at lower alloy amounts than in binary Cu—Al and Cu—Sn alloys, yet copper ion release through corrosion is not inhibited, permitting continual antimicrobial action at the surface. Further, while copper alloys comprising Al and Sn have been previously described (see Wojtas et al., Corrosion Science. 37(5) (1995) 793-799), this prior study generally suggests that an Al concentration of between about 14-16 atomic % (i.e., about 6 wt %) is needed to achieve tarnish-resistance. However, the alloys previously described do not possess and/or maintain antimicrobial function as their alloying amounts are outside the synergistic compositional window of the presently disclosed subject matter. As described herein, lower amounts of Al (e.g. between 0.5 wt % and about 5 wt %) are shown to provide tarnish-resistance in Cu alloys also comprising between 0.5 wt % and about 5 wt % Sn. The compositions of the previously described Cu—Al—Sn alloys did not possess the appropriate combination of elements for a synergistic effect of both elements for tarnish resistance combined with antimicrobial function. Without being bound to any one theory, it is believed that the present lower level of Al produces a thin oxide by doping of the copper oxide with Al cations. In contrast, alloys with 6 wt % Al form an Al oxide instead of a copper oxide, which reduces the ability of the alloy to release Cu cations through the oxide to maintain antimicrobial effect.

Commercially available copper alloys include "Nordic Gold" (Cu-5Zn-5Al-1Sn) and UNS C63800 (3 wt % Al, and 1 wt % Si). Both alloys are labeled as antimicrobial. However, one aspect of the presently disclosed subject matter is the provision of an antimicrobial copper alloy that does not include Zn or Si. Furthermore, the presently disclosed compositions accomplish a balance between corrosion and tarnish resistance without the use of Zn, Mn, or Ni, which are often present in tarnish-resistant alloys, but which can impart undesirable colors or other undesirable effects. In particular, although Ni is often used in copper alloys due to its non-tarnishing ability, it is an increasingly common metal allergen (see Villapún et al., Materials. 9 (2016) 736) and can promote an allergenic response upon direct contact (contact dermatitis). In contrast with prior art, the presently disclosed compositions are also hypoallergenic and accomplish the balanced goals of corrosion sufficient to promote Cu ion release and tarnish resistance without the use of Ni.

Accordingly, in some embodiments, the presently disclosed subject matter provides a copper alloy composition having an arrangement of elements in specific targeted amounts that have a synergistic effect on combining tarnish-resistance with simultaneous continuous preferential release of soluble copper ions to the local environment to facilitate antimicrobial function. This antimicrobial function has been demonstrated to destroy/inactivate antibiotic-resistant strains of bacteria and provides a means of infection control by controlling transmission of these harmful bacteria before the infection stage. In some embodiments, the presently disclosed subject matter provides a tarnish-resistant Cu-based alloy with continuous preferential Cu-release for antimicrobial applications. In some embodiments, the presently disclosed subject matter provides, among other things, an antimicrobial, hypoallergenic, and tarnish-resistant Cu-based alloy.

III. Ternary Cu—Al—Sn Alloys

In some embodiments, the presently disclosed subject matter provides a Cu alloy that is antimicrobial and able to kill a variety of harmful bacteria on direct contact. In some embodiments, the Cu alloy provides continuous release of Cu cations. For example, in some embodiments, the Cu release is continuous for at least about one or more days, weeks, or months. In some embodiments, the Cu release is continuous for at least about one week.

The antimicrobial activity of the Cu alloy can be measured for one or more particular microbe (e.g., a particular bacteria) in one or more particular environments over the course of a given time period (e.g., one or more hours, days or weeks). In some embodiments, the environment is aerated artificial perspiration, which can be used to mimic conditions related to high-touch surfaces. In some embodiments, the Cu release from the alloy is continuous for at least about one week in the presence of artificial perspiration. Alternatively, the antimicrobial activity of the Cu alloy can be measured in a different environment, e.g., ambient room conditions, such as at a temperature between about 18° C. and about 27° C. and at a relative humidity between about 40 and about 60%.

In some embodiments, the antimicrobial alloy has an about 100% killing efficiency for E. coli (i.e., as an exemplary bacteria) after about 24 hours or less (e.g., about 22, 20, 18, 16, 14, 12 or about 10 hours or less). In some embodiments, the 100% killing efficiency is measured for a 1.1 cm$^2$ surface of the alloy contacted with about 2×10$^6$ colony forming units (CFU) of the E. coli. In some embodiments, the E. coli killing efficiency of the alloy is the activity in the presence of an aerated solution of artificial perspiration with a volume of 200 mL or less.

In some embodiments, an amount of soluble Cu cations in an aqueous solution in contact with the surface of the copper alloy is about 0.8 parts-per-million (ppm) or more (about 0.8 ppm, about 0.9 ppm, about 1.0 ppm, about 1.1 ppm, about 1.2 ppm, about 1.3 ppm, about 1.4 ppm, about 1.5 ppm, or about 1.6 ppm or more). In some embodiments, the aqueous solution is in contact with the surface of the copper alloy (e.g., an about 1.1 cm$^2$ surface of the alloy) for about 24, 48, 72, 96, 120 or more hours, or for about one week or more).

In some embodiments, the presently disclosed subject matter provides a Cu alloy that is tarnish-resistant, i.e., an alloy that maintains good resistance to surface discoloration and dulling from surface oxides/corrosion products. In some embodiments, the surface of the Cu alloy is free or substantially free of dark discoloration and/or a brown appearance upon visual inspection. In some embodiments, the surface of the Cu alloy is relatively free of dark discoloration and/or a brown appearance (e.g., in comparison to non-alloyed Cu or another Cu alloy) upon visual inspection. In some embodiments, the resistance to surface discoloration is determined in the presence of a particular environment, e.g., aerated artificial perspiration, and/or over a particular time period (e.g., about 1, 2, 3, 4, 5, 6, 7 or more days or one or more weeks or months). In some embodiments, the surface of the Cu alloy is free of any oxide layer that is not optically transparent or substantially optically transparent. In some embodiments, any oxide layer formed on the Cu alloy surface is relatively thin, e.g., about 0.5 micrometers thick or less (about 0.5, 0.4, 0.3, 0.2, 0.1, 0.05 micrometers thick or less).

In some embodiments, the Cu alloy is both tarnish-resistant as described above and antimicrobial, providing continuous release of Cu cations, e.g., for at least about one or more days, weeks, or months.

In some embodiments the Cu alloy is also hypoallergenic. For instance, in some embodiments, the Cu alloy does not contain Ni.

In some embodiments, the Cu alloy that is not passive and does not form an oxide which renders the alloy electrochemically inert (i.e. become an ideally polarizable electrode). In some embodiments, the Cu alloy has a surface having a corrosion current density of at least about 0.1 µA/cm$^2$ at 0 V versus a saturated calomel reference electrode.

In some embodiments, the antimicrobial, tarnish-resistant, hypoallergenic Cu alloy is a ternary Cu alloy containing between about 0.5 wt % and about 5 wt % Al and between about 0.5 wt % Sn and about 5 wt % Sn, with the remainder Cu and unavoidable impurities. In some embodiments, the Cu alloy is other than Cu-5 wt % Al-5 wt % Sn.

In some embodiments, the antimicrobial, tarnish-resistant, hypoallergenic Cu alloy contains at least about 1 wt % Sn but not greater than about 5 wt % Sn (e.g., about 1.0, 1.5, 2.0, 2.5, 3.0, 3.5, 4.0, 4.5, or 5.0 wt % Sn) and between about 1 wt % Al and about 4.5 wt % Al (e.g., about 1.0, 1.5, 2.0, 2.5, 3.0, 3.5, 4.0, or about 4.5 wt % Al). In some embodiments, the antimicrobial, tarnish-resistant, hypoallergenic Cu alloy contains at least about 1 wt % Al but not greater than about 5 wt % Al (e.g., about 1.0, 1.5, 2.0, 2.5, 3.0, 3.5, 4.0, 4.5, or 5.0 wt % Al) and between about 1 wt % Sn and about 4.5 wt % Sn (e.g., about 1.0, 1.5, 2.0, 2.5, 3.0, 3.5, 4.0, or about 4.5 wt % Sn). In some embodiments, the alloy is selected from the group comprising Cu-1 wt % Al-1 wt % Sn, Cu-1 wt % Al-5 wt % Sn, and Cu-5 wt % Al-1 wt % Sn. However, the alloy could also be, for example, Cu-4Al-2Sn. In some embodiments, the alloy is Cu-5 wt % Al-1 wt % Sn.

In some embodiments, the Cu alloy is a monophasic solid solution. In some embodiments, the Cu alloy has a face-centered cubic (fcc) lattice structure.

In some embodiments, the Cu alloy does not contain Zn, Mn, or Si other than in impurity concentrations. Thus, for example, in some embodiments, the Cu alloy does not contain more than about 50 ppm, about 40 ppm, about 30 ppm, about 20 ppm, or about 10 ppm of Zn, Mn, or Si. In some embodiments, the Cu alloy contains less than about 10 ppm of Zn, Mn, or Si. In some embodiments, the Cu alloy contains less than about 50 ppm, less than about 40 ppm, less than about 30 ppm, less than about 20 ppm, or less than about 10 ppm of Zn, Mn, and Si combined. In some embodiments, the Cu alloy is free of Zn, Mn, and/or Si. In some embodiments, the Cu alloy is free of Zn.

IV. Articles of Manufacture Comprising Ternary Cu Alloys

As the presently disclosed antimicrobial, tarnish-resistant, hypoallergenic alloys can provide effective and long-lasting microbial killing effect for a variety of microbes without discoloration, they can be used to form a variety of articles, either in whole or in part. Accordingly, in some embodiments, the presently disclosed subject matter provides an article of manufacture comprising a Cu alloy as described above, e.g. a ternary Cu alloy containing between about 0.5 wt % and about 5 wt % Al and between about 0.5 wt % Sn and about 5 wt % Sn, with the remainder Cu and unavoidable impurities, and wherein said Cu alloy is antimicrobial, tarnish-resistant, and hypoallergenic. In some embodiments, the Cu alloy is other than Cu-5 wt % Al-5 wt % Sn. In some embodiments, the antimicrobial, tarnish-resistant, hypoallergenic Cu alloy contains at least 1 wt % Sn but not greater than 5 wt % Sn (e.g., about 1.0, 1.5, 2.0, 2.5, 3.0, 3.5, 4.0, 4.5, or 5.0 wt % Sn) and between about 1 wt % Al and about 4.5 wt % Al (e.g., about 1.0, 1.5, 2.0, 2.5, 3.0, 3.5, 4.0, or about 4.5 wt % Al). In some embodiments, the antimicrobial, tarnish-resistant, hypoallergenic Cu alloy contains at least about 1 wt % Al but not greater than about 5 wt % Al (e.g., about 1.0, 1.5, 2.0, 2.5, 3.0, 3.5, 4.0, 4.5, or 5.0 wt % Al) and between about 1 wt % Sn and about 4.5 wt % Sn (e.g., about 1.0, 1.5, 2.0, 2.5, 3.0, 3.5, 4.0, or about 4.5 wt % Sn). In some embodiments, the alloy is selected from the group comprising Cu-1 wt % Al-1 wt % Sn, Cu-1 wt % Al-5 wt % Sn, and Cu-5 wt % Al-1 wt % Sn. In some embodiments, the alloy is Cu-5 wt % Al-1 wt % Sn. The article of manufacture can include at least one component made from the alloy or covered with a layer, coating, or applique comprising the alloy.

In some embodiments, the article of manufacture comprises a high-touch surface, i.e., a surface likely to be touched multiple times (e.g., about 5, 10, 20, 30, 40, 50, 100, 500, 1,000 or more times) per day and/or by multiple individuals (e.g., about 5, 10, 20, 30, 40, 50, 100, 500, 1,000 or more individuals) per day. In some embodiments, the article of manufacture is an article used in a medical, veterinary, or dental facility. In some embodiments, the article is used in a hospital. However, other locations can also benefit from the presence of the articles, including any location open to the public, (e.g., stores and shopping centers, airports, train, bus or other mass transit vehicles and stations, schools, daycares, laboratories, business offices, theaters, banks, gyms/health clubs, restaurants, hotels, park facilities, etc.). The articles of manufacture can also be used in less public areas, including residential buildings (e.g., homes, apartment buildings, and other residences, e.g., nursing facilities).

In some embodiments, the article of manufacture is selected from the group including, but not limited to, a medical or dental device; furniture, such as a hospital bed or a portion thereof (e.g., a bedrail or footboard), a table (e.g., an over-bed table or a bedside table), chair or sofa (e.g., for use in a hospital room, exam room or waiting area); a hand railing (e.g., along a corridor or walkway wall, in a stairwell, or in a restroom); a door or window handle, knob, or fitting; a tray table; a tray (e.g., a food tray or an instrument tray); an assistive device (e.g., a wheel chair, walker, cane or crutch); or a hospital room call button. Additional articles include, but are not limited to, automatic door push plates, toilet safety rails, carts (e.g., hospital carts, computer carts, shopping carts, equipment carts), sinks, sink handles, drain control levers, paper towel holders, push buttons on air hand dryers, drawer knobs, shower or bathtub grab bars, towel bars, toilet hardware (e.g., levers and push buttons), light switches, switch plates, thermostat covers and controls, telephone hand sets, instrument handles, food trays, instrument trays, bedpans, exercise equipment, physical therapy equipment, medical chart holders, laundry hampers, television controls, a computer mouse, a computer keyboard, a personal digital assistant, toothbrush holders, pens, ATM machines, gym lockers, elevator handrails or control buttons, soap holders, soap dispensers, toilet paper dispensers, bracelets, water fountain knobs and/or buttons, kitchen cabinet door handles, microwave handles, refrigerator handles, stove top control buttons, play area equipment, smart phone covers, vending machines, etc.

In some embodiments, the article of manufacture can be a composite material comprising a sheet or foil of the copper alloy affixed to a layer comprising a polymeric adhesive (and optionally a detachable backing layer that can be removed from the adhesive when the composite is ready to be affixed to the surface of an object). Thus, in some embodiments, the composite can be used to affix a layer of the alloy to an existing high touch surface (e.g., that is made of another metal, such as steel or aluminum). Alternatively, in some embodiments, a layer of the alloy can be placed on a pre-existing high touch surface directly via any suitable technique, such as sputter deposition, chemical vapor deposition or physical vapor deposition. In some embodiments, a thin layer of the alloy can be prepared as a cuff or sleeve to place around a railing or other cylindrical surface. In some embodiments, a particular component of the article can be prepared from the alloy. Thus, for example, the alloy can be shaped or molded into a bed rail or chair arm and used in the manufacture of a hospital bed or chair.

V. Methods of Reducing the Incidence of Microbial Infection

In some embodiments, the presently disclosed subject matter provides a method of reducing the incidence of microbial infection. In some embodiments, the method comprises providing a surface comprising a Cu alloy as described hereinabove, e.g., a ternary Cu alloy containing between about 0.5 wt % and about 5 wt % Al and between about 0.5 wt % Sn and about 5 wt % Sn, with the remainder Cu and unavoidable impurities, and wherein said Cu alloy is antimicrobial, tarnish-resistant, and hypoallergenic. In some embodiments, the Cu alloy is other than Cu-5 wt % Al-5 wt % Sn. In some embodiments, the antimicrobial, tarnish-resistant, hypoallergenic Cu alloy contains at least about 1 wt % Sn but not greater than about 5 wt % Sn (e.g., about 1.0, 1.5, 2.0, 2.5, 3.0, 3.5, 4.0, 4.5, or 5.0 wt % Sn) and between about 1 wt % Al and about 4.5 wt % Al (e.g., about 1.0, 1.5, 2.0, 2.5, 3.0, 3.5, 4.0, or about 4.5 wt % Al). In some embodiments, the antimicrobial, tarnish-resistant, hypoallergenic Cu alloy contains at least about 1 wt % Al but not greater than about 5 wt % Al (e.g., about 1.0, 1.5, 2.0, 2.5, 3.0, 3.5, 4.0, 4.5, or 5.0 wt % Al) and between about 1 wt % Sn and about 4.5 wt % Sn (e.g., about 1.0, 1.5, 2.0, 2.5, 3.0, 3.5, 4.0, or about 4.5 wt % Sn). In some embodiments, the alloy is selected from the group comprising Cu-1 wt % Al-1 wt % Sn, Cu-1 wt % Al-5 wt % Sn, and Cu-5 wt % Al-1 wt % Sn. In some embodiments, the alloy is Cu-5 wt % Al-1 wt % Sn.

In some embodiments, the method reduces the incidence of microbial infection (e.g., by about 20, 30, 40, 50, 60, 70, 80, or 90% or more) in comparison to the microbial infection rate or total number of infections when the surface does not comprise the Cu alloy.

In some embodiments, the providing comprises adding a coating layer comprising the Cu alloy to a surface present in a public space (e.g., a medical, veterinary, or dental facility, a school (e.g., an elementary school, a middle school, a high school, a trade school, a college or a university), airport, train or bus station, a store or shopping center, an office, a government building, a museum, a restaurant, a park, a zoo, a theater, etc.). In some embodiments, the method comprises providing an article of manufacture comprising at least one component comprising the Cu alloy, such as, but not limited to, a piece of furniture (e.g., a chair, bed, sofa, or table), a hand railing, a room fitting (e.g., a door or window handle or light switch), a communications device, a computer keyboard or mouse, a personal digital assistant, or a medical, veterinary, or dental device (e.g., a stethoscope).

In some embodiments, the public space is a medical, veterinary or dental facility or a space associated with public transportation (e.g., buses, bus stations, trains (including subway trains), train stations (including subway stations), planes, airports, taxis, cable cars, trams, etc.). In some embodiments, the public space is a hospital or urgent-care facility.

In some embodiments, the surface is part of an article selected from a railing, a room fitting (e.g., door or window handle, a light switch, etc.), a medical, veterinary, or dental device, a medical facility furniture (e.g., a hospital bed or hospital bed rail or a hospital room or waiting room chair or the arm thereof), a tray table, a tray, a hospital room call button, or an assistive device (e.g., a wheel chair, walker, crutch, or cane).

EXAMPLES

The following Examples have been included to provide guidance to one of ordinary skill in the art for practicing representative embodiments of the presently disclosed subject matter. In light of the present disclosure and the general level of skill in the art, those of skill can appreciate that the following Examples are intended to be exemplary only and that numerous changes, modifications, and alterations can be employed without departing from the scope of the presently disclosed subject matter.

Example 1

Preparation of Ternary Copper Alloys

Ternary alloys were made from Cu, Al, and Sn elements of 99.99% pure (or greater) element purity. Alloys were arc-melted in an inert gas atmosphere (argon), flipped three times and remelted and then drop cast into a chilled cylindrical copper mold. Single-phase solid solution alloy crystal structures were verified with X-ray diffraction confirming the absence of a secondary metallic or intermetallic phase.

The method of preparing the presently disclosed alloys is not limited to the method described above, however, but can be performed by any suitable method known in the field. Thus, for example, if desired, the presently disclosed ternary alloys can be prepared by other methods, such as, but not limited to, an additive manufacturing process.

Example 2

Tarnish, Antimicrobial, Soluble Ion and Electrochemical Studies of Ternary Copper Alloys Artificial perspiration was made according to BS EN1811 (2011) but titrated to pH 6.5 using $NH_4OH$. The composition of the artificial perspiration was 0.5 wt % NaCl, 0.1 wt % Urea ($CH_4N_2O$), and 0.1 wt % 90% lactic acid ($C_3H_6O_3$) solution.

The reversible Nernst potentials for copper corrosion products are within the electrochemical stability window of water (0-1.23 $V_{SHE}$). In the absence of dissolved oxygen, these compounds can be galvanostatically reduced in aqueous electrolytes. See ATSM, B825 (2013). A constant cathodic current of −20 µA was applied (A=0.8 $cm^2$, −25 µA/$cm^2$) to pre-exposed samples in a deaerated borate buffer solution (pH 8.4). Deaerated solution was hydraulically transferred to reduction cells. Reduction cells (~400 mL total volume) were $N_2$-purged for 10 min prior to direct electrolyte transfer from the deaeration flask. Continuous bubbling of reduction cells ensured deaeration throughout the cathodic reduction of the oxide to reduce the background rate of oxygen reduction. Oxide reduction potentials were measured using a mercury/mercurous sulfate electrode (MMSE) fitted with Luggin tips. The charge of the oxide can be determined from the chronopotential curve via the following relation (Equation 1).

$$Q_{oxide} = i_{app} * t_{red} \quad \text{Equation 1}$$

where $i_{app}$ is the applied current density (−25 µA/$cm^2$) and $t_{red}$ is the reduction time, determined as time between local maximum potential changes, i.e. the time between maxima in the first derivative plots of chronopotential curves according to previously published procedures. See Foster et al., Corrosion. 72 (2016) 51-65; and Hutchison et al., Electrochimica Acta. 241 (2017) 73-88.

Visual condition was evaluated with a flat-bed document scanner at a resolution of 300 dpi and color-corrected using a standard grey-card background.

*Escherichia Coli* (*E. Coli*, HCB1) survivability was assessed using the most probable number (MPN) enumeration method using Quanti-Tray 2000 and Colilert (IDEXX®) indicator. Alloy samples were cast in epoxy with a set exposed area of 1.1 $cm^2$ and polished to 1200 grit under ethanol. Polished samples were placed in 200 mL of artificial perspiration and inoculated with ~$10^6$ colony-forming units of bacteria. Aliquot samples were measured at four hour time intervals up to 48 hours. A control test was conducted of artificial perspiration with no metal contact and was sampled once a day up to 96 hours. See Foster et al., Corrosion. 72 (2016) 51-65.

Potentiodynamic polarizations of alloy samples were conducted in artificial perspiration, and 1 M HCl. Both solutions were naturally aerated. Freshly polished samples were cathodically polarized to −1.5 $V_{SCE}$ for 10 minutes to reduce any air-formed oxide films and then scanned upwards at a rate of +0.1667 mV/s to +0.5 $V_{SCE}$.

Soluble ion concentration of released Cu, Al, and Sn were measured with inductively-coupled plasma-optical emission spectroscopy. Concentrations were determined from calibration with serial-diluted standards of known concentration. Limits of detection (LOD) were defined as the value of a blank sample plus three times the standard deviation added to this value. LOD for Cu, Al, and Sn were 17, 198, and 40 parts-per-billion (ppb), respectively.

Example 3

Discussion of Studies of Ternary Copper Alloys

Figure 1:
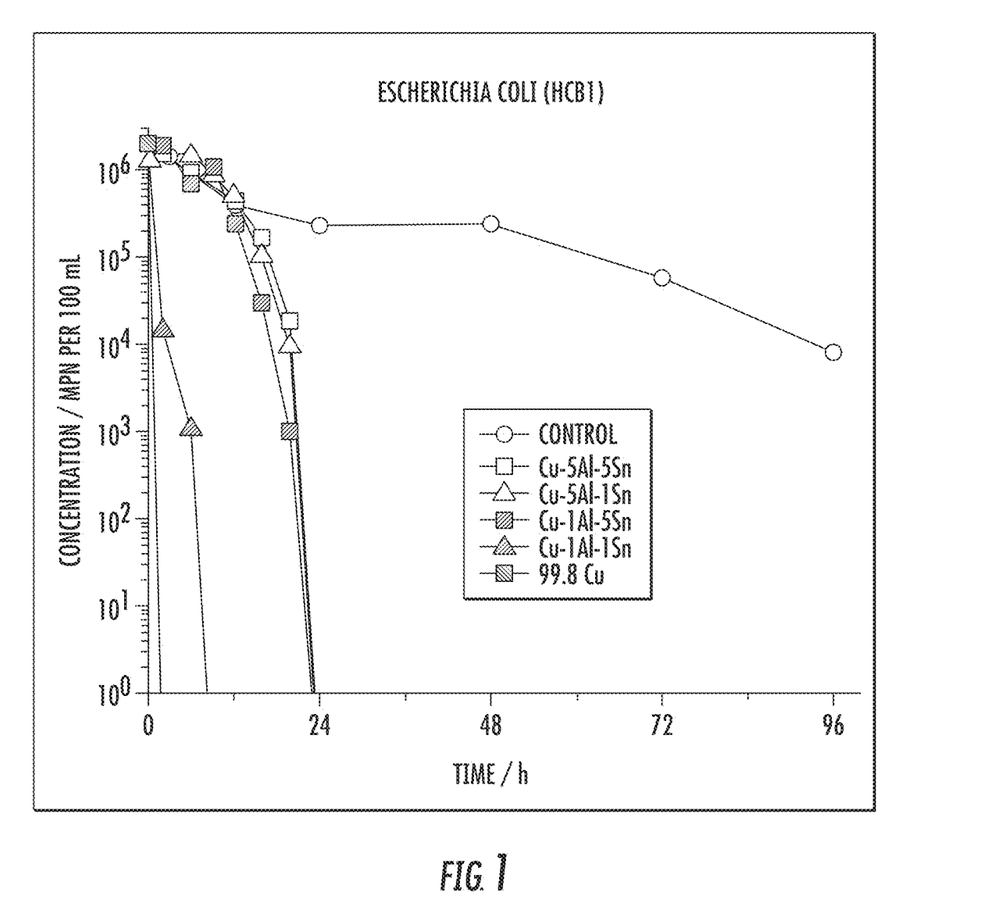

FIG. 1 shows the antimicrobial effect of exemplary ternary copper alloys comprising Cu, Al, and Sn. Planktonic *E. Coli* was completely killed by the alloys with non-recoverable rapid death within 24 hours, as was also shown for several over alloys of similar composition.

Figure 2A:
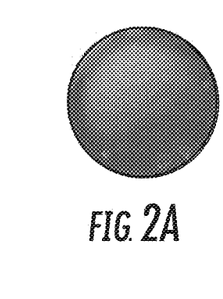
FIG. 2A is a scanned image of the surface of 99.8 weight % copper (Cu) following 96 hours in artificial perspiration.
Figure 2B:
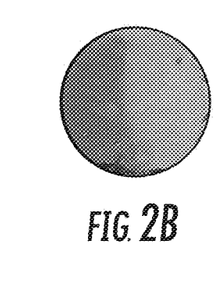
FIG. 2B is a scanned image of the surface of a ternary copper (Cu) alloy comprising 1 weight % (wt %) aluminum (Al) and 1 wt % tin (Sn) following 96 hours in artificial perspiration.
Figure 2C:
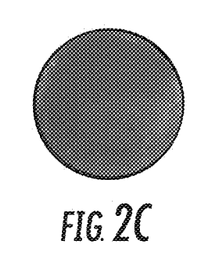
FIG. 2C is a scanned image of the surface of a ternary copper (Cu) alloy comprising 1 weight % (wt %) aluminum (Al) and 5 wt % tin (Sn) following 96 hours in artificial perspiration.
Figure 2D:
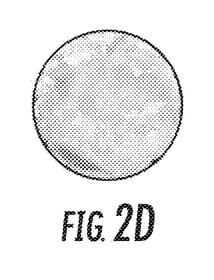
FIG. 2D is a scanned image of the surface of a ternary copper (Cu) alloy comprising 5 weight % (wt %) aluminum (Al) and 1 wt % tin (Sn) following 96 hours in artificial perspiration.
Figure 2E:
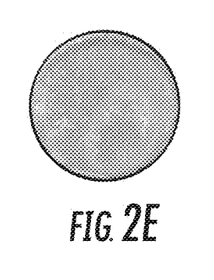
FIG. 2E is a scanned image of the surface of a ternary copper (Cu) alloy comprising 5 weight % (wt %) aluminum (Al) and 5 wt % tin (Sn) following 96 hours in artificial perspiration.
Figure 2F:
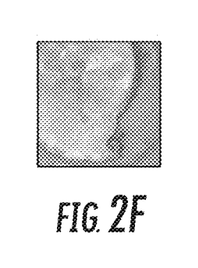
FIG. 2F is a scanned image of the surface of a binary copper (Cu) alloy comprising 5 weight % (wt %) aluminum (Al) following 96 hours in artificial perspiration.
Figure 2G:
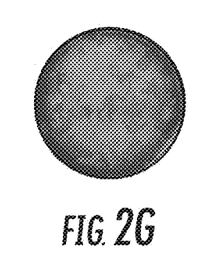
FIG. 2G is a scanned image of the surface of a binary copper (Cu) alloy comprising 1 weight % (wt %) tin (Sn) following 96 hours in artificial perspiration.

The visual condition (tarnish) of the exemplary Cu—Al—Sn alloys is shown in FIGS. 2B-2E, while that of Cu is shown in FIG. 2A. A clear synergistic effect is shown by the unique combination of Al and Sn alloying elements as demonstrated by the difference in tarnishing behavior between the individual binary alloy tarnishing behavior shown in FIGS. 2F and 2G as compared to that of the corresponding ternary alloy. See FIG. 2D. Incomplete tarnish-resistance is observed on the surface of the Cu-5Al alloy following exposure to aerated artificial perspiration (see FIG. 2F) and a complete lack of tarnish protection by the Cu-1Sn alloy. See FIG. 2G. Thus, FIGS. 2A-2G illustrate that the particular combination of Al and Sn in Cu alloys as presented herein reduces tarnish film thickness and tarnish discoloration, while at the same time having antimicrobial efficacy as shown in FIG. 1.

Figure 3A:
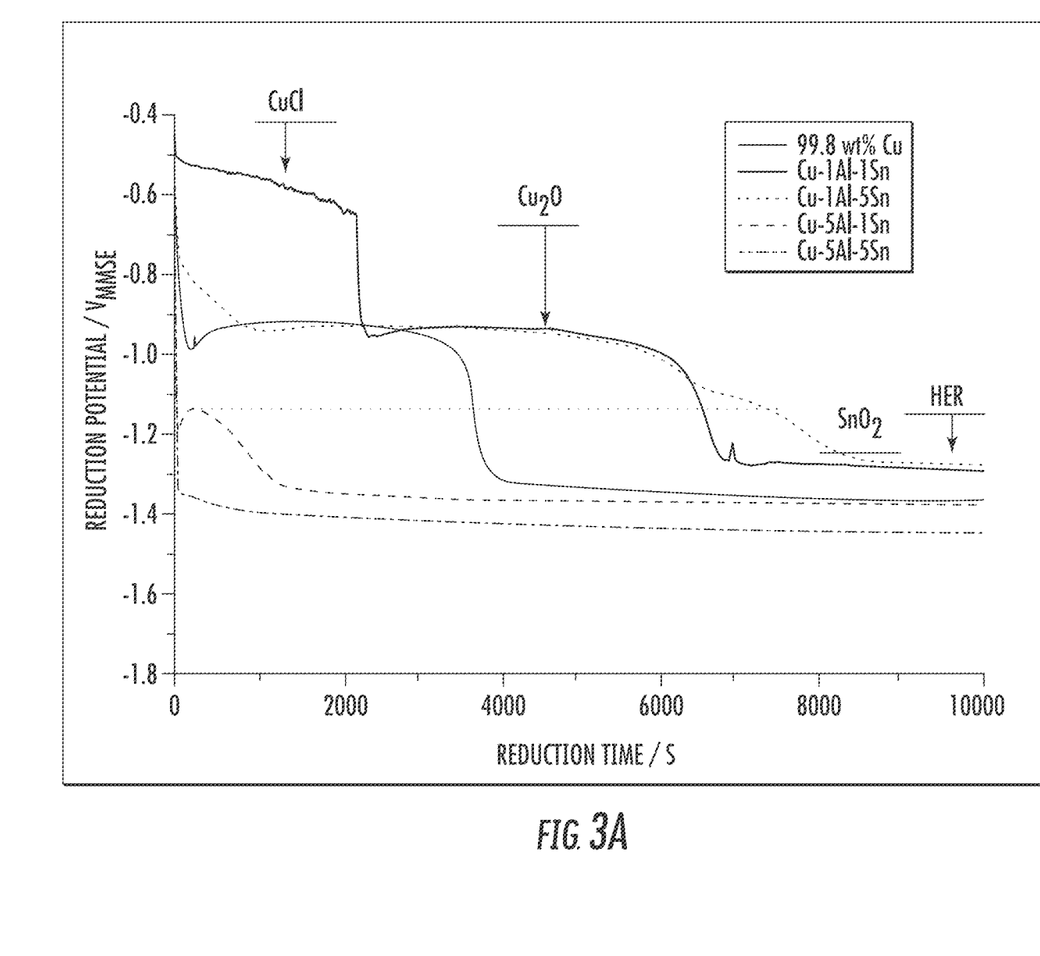
FIG. 3B is a graph showing the calculated quantity of anodic charge (in coulombs per square centimeter (Coul $cm^{-2}$)) equal to the oxide reduced from the reduction described in FIG. 3A presented as stacked cumulative plots of cuprous oxide ($Cu_2O$) and cuprous chloride (CuCl). Data is provided for, from left to right, 99.8 weight % (wt %) Cu, a ternary alloy comprising Cu, 1 wt % aluminum (Al) and 1 wt % tin (Sn) (i.e., Cu-1Al-1Sn), a ternary alloy comprising Cu, 1 wt % Al and 5 wt % Sn (i.e., Cu-1Al-5Sn), a ternary alloy comprising Cu, 5 wt % Al and 1 wt % Sn (i.e., Cu-5Al-1Sn), and a ternary alloy comprising Cu, 5 wt % Al, and 5 wt % Sn (i.e., Cu-5Al-5Sn).
Figure 3B:
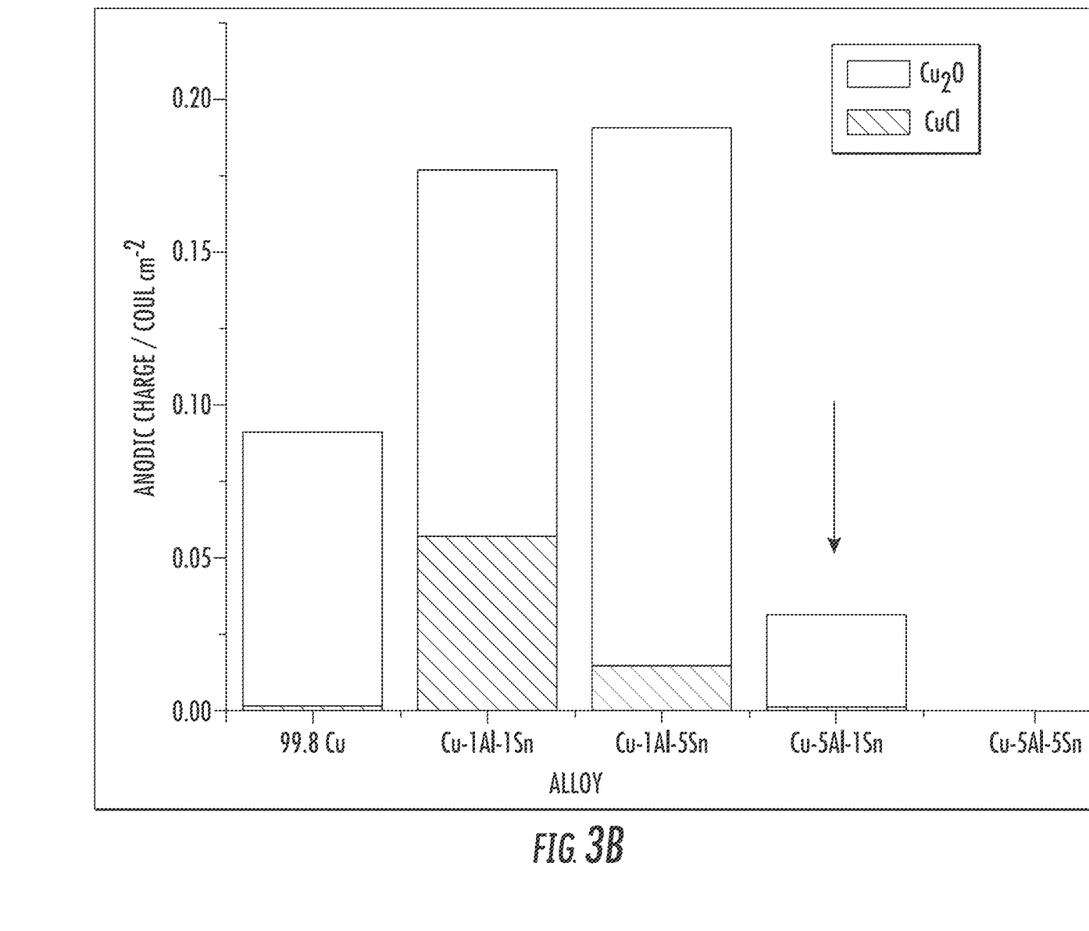
Figure 4:
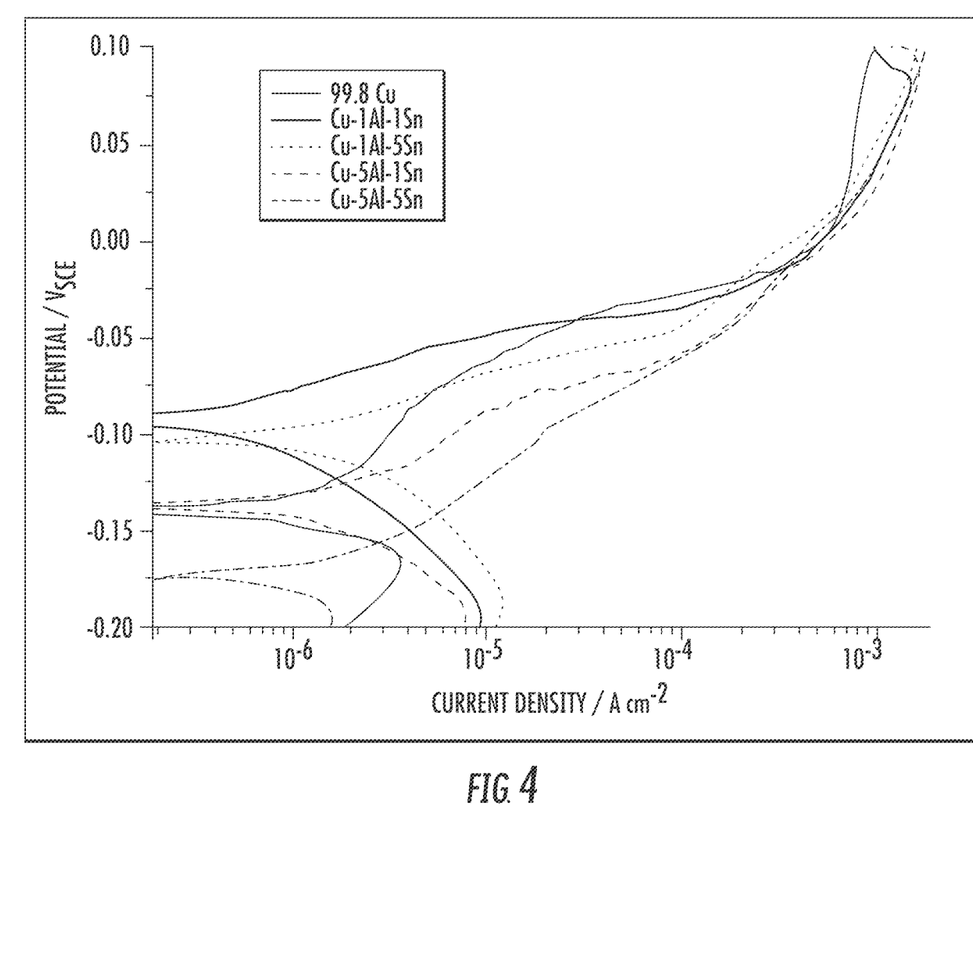
FIG. 4 is a graph showing an expanded section of the potentiodynamic polarization curves of copper-aluminum-tin (Cu—Al—Sn) alloys in naturally aerated artificial perspiration following 10 minutes of cathodic cleaning stage prior to upward sweep. Potential (versus saturated calomel electrode (SCE)) versus current density (in ampere per square centimeter (A $cm^{-2}$) is shown for 99.8 weight % (wt %) Cu, a ternary alloy comprising Cu, 1 wt % aluminum (Al) and 1 wt % tin (Sn) (i.e., Cu-1Al-1Sn), a ternary alloy comprising Cu, 1 wt % Al and 5 wt % Sn (i.e., Cu-1Al-5Sn), a ternary alloy comprising Cu, 5 wt % Al and 1 wt % Sn (i.e., Cu-5Al-1Sn), and a ternary alloy comprising Cu, 5 wt % Al, and 5 wt % Sn (i.e., Cu-5Al-5Sn).
Figure 5:
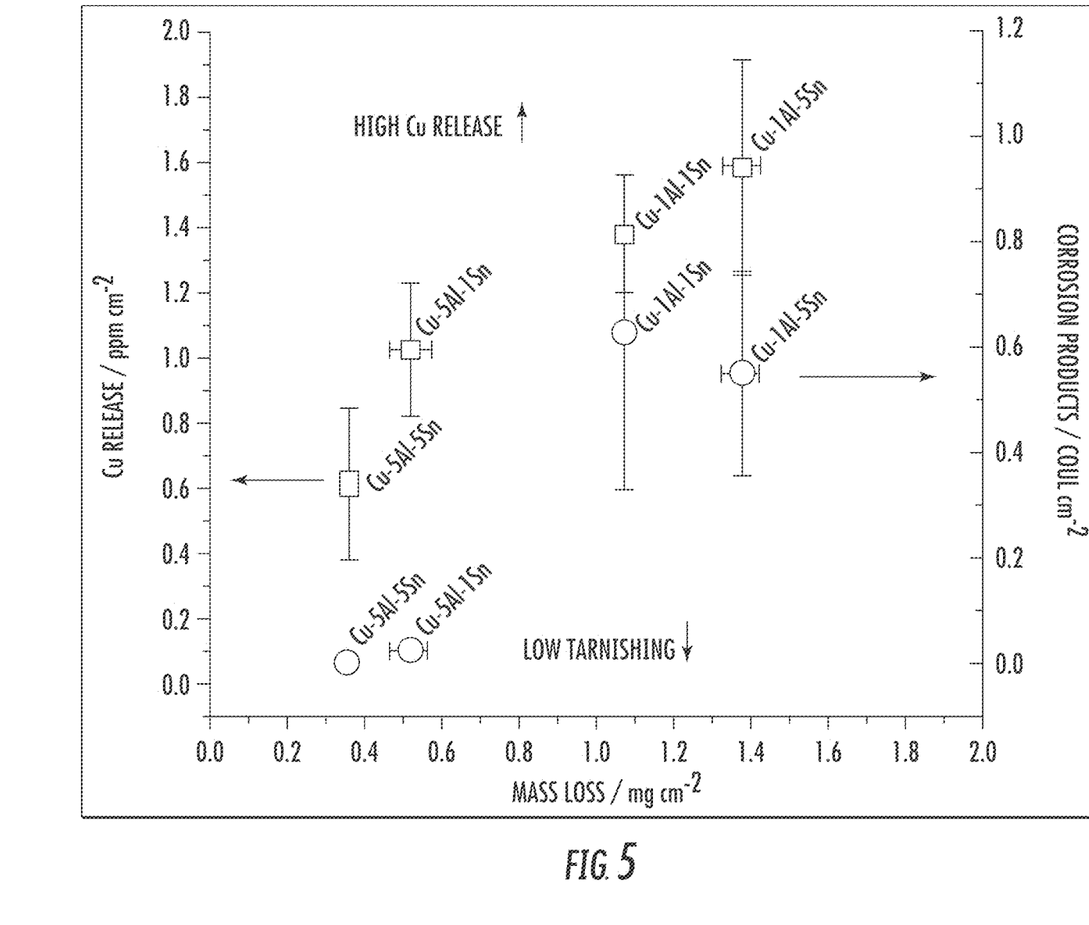
FIG. 5 is a graph comparing the mass loss (in milligrams per square centimeter (mg $cm^{-2}$) with soluble copper (Cu) release (in parts-per-million per square centimeter (ppm $cm^{-2}$) (squares) and reducible corrosion product charge (in coulomb per square centimeter (Coul $cm^{-2}$) (circles) for Cu and exemplary ternary copper alloys following open circuit exposure to artificial perspiration for 96 hours. Data is provided for 99.8 weight % (wt %) Cu, a ternary alloy comprising Cu, 1 wt % aluminum (Al) and 1 wt % tin (Sn) (i.e., Cu-1Al-1Sn), a ternary alloy comprising Cu, 1 wt % Al and 5 wt % Sn (i.e., Cu-1Al-5Sn), a ternary alloy comprising Cu, 5 wt % Al and 1 wt % Sn (i.e., Cu-5Al-1Sn), and a ternary alloy comprising Cu, 5 wt % Al, and 5 wt % Sn (i.e., Cu-5Al-5Sn).

In addition to visual evidence, the amount of oxides formed on the surface also decreased significantly from 200 $mC/cm^2$ to 30 $mC/cm^2$ (approx. 0.25 μm to 40 nm) with just a change of 4 wt % of each of Al and Sn at the same copper content (94 wt %). See FIG. 3B. Thus, without being bound to any one theory, it is believed that the surface of the present alloys forms a relatively thin optically transparent oxide layer (e.g., having a thickness of about 0.5 micrometers or less), even after exposure to artificial perspiration for one week or more. The chronopotential plots of FIG. 3A also show shorter reduction time (faster to lowest potential) inferring a thinner oxide layer. The results of FIGS. 3A and 3B are consistent with the results illustrated in FIGS. 2A-2G; the combination of particular amounts of Al and Sn in presently disclosed alloys reduces tarnish film thickness and tarnish discoloration, while having anti-microbial efficacy as shown in FIG. 1. The electrochemical behavior of the alloys in sweat (see FIG. 4) further indicated that the surface oxide layer grown in artificial perspiration on the present alloys was not passive, but rather had a corrosion current density of at least 0.1 μA/cm² at 0 V versus a saturated calomel reference electrode. A passive oxide layer would have a current density below this value and, subsequently not be antimicrobial due to a lack of Cu ion release. Soluble copper ion release from the alloys is shown in FIG. 5.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A copper (Cu) alloy consisting of about 5 weight (wt) % aluminum (Al) and about 1 wt % tin (Sn) with the remainder Cu and unavoidable impurities of 50 parts-per-million (ppm) or less, wherein said Cu alloy is a monophasic solid solution and is antimicrobial, tarnish-resistant and hypoallergenic, and wherein the surface of the Cu alloy forms an optically transparent oxide layer that has a thickness of about 0.5 micrometer or less after polishing and exposure to artificial perspiration for one week or more.

2. The Cu alloy of claim 1, wherein a 1.1 cm² surface of the Cu alloy has about a 100% killing efficiency for *E. coli* after 24 hours wherein the surface is contacted with about 2×10⁶ colony forming units (CFU) of *E. coli* in the presence of an aerated solution of artificial perspiration with a volume of 200 mL or less.

3. An article of manufacture comprising the Cu alloy of claim 1.

4. The article of manufacture of claim 3, wherein said article of manufacture is selected from the group consisting of a medical, veterinary, or dental device; medical facility furniture; a hand railing, a door or window handle or fitting; a tray table; a hospital room call button; a chair or sofa; a wheel chair; a walker; a cane or crutch; automatic door push plates; toilet safety rails; carts; sinks, sink handles; drain control levers; paper towel holders; push buttons on air hand dryers; drawer knobs, shower or bathtub grab bars; towel bars; toilet hardware; light switches; switch plates; thermostat covers and controls; telephone handsets; instrument handles; food trays; instrument trays; bedpans; exercise equipment; physical therapy equipment; medical chart holders; laundry hampers; television controls; a computer mouse; a computer keyboard; a personal digital assistant; toothbrush holders; pens; ATM machines; gym lockers; elevator handrails or control buttons; soap holders; soap dispensers; toilet paper dispensers; bracelets; water fountain knobs and/or buttons; kitchen cabinet door handles; microwave handles; refrigerator handles; stove top control buttons; play area equipment; smart phone covers; and vending machines.

5. A method of reducing the incidence of microbial infection, the method comprising providing a surface comprising a copper (Cu) alloy, wherein said Cu alloy is a monophasic solid solution and is antimicrobial, tarnish-resistant and hypoallergenic, further wherein said Cu alloy consists of about 5 weight (wt) % aluminum (Al) and about 1 wt % tin (Sn) with the remainder Cu and unavoidable impurities of 50 parts-per-million (ppm) or less, and wherein the surface of the Cu alloy forms an optically transparent oxide layer that has a thickness of about 0.5 micrometer or less after polishing and exposure to artificial perspiration for one week or more.

6. The method of claim 5, wherein a 1.1 cm² surface of the Cu alloy has about a 100% killing efficiency for *E. coli* after 24 hours when said surface is contacted with about 2×10⁶ colony forming units (CFU) of *E. coli* in the presence of an aerated solution of artificial perspiration with a volume of 200 mL or less.

7. The method of claim 5, wherein the providing comprises adding a coating layer comprising the Cu alloy to a surface present in a public space.

8. The method of claim 7, wherein the public space is a medical facility, a space associated with public transportation, a hospital, or an urgent-care facility.

9. The method of claim 5, wherein the Cu alloy is provided on the surface of a piece of furniture, a hand railing, a room fitting, or a medical, veterinary, or dental device.

10. The method of claim 5, wherein the surface is part of an article selected from the group consisting of a medical, veterinary, or dental device; medical facility furniture; a hand railing, a door or window handle or fitting; a tray table; a hospital room call button; a chair or sofa; a wheel chair; a walker; a cane or crutch; automatic door push plates; toilet safety rails; carts; sinks, sink handles; drain control levers; paper towel holders; push buttons on air hand dryers; drawer knobs, shower or bathtub grab bars; towel bars; toilet hardware; light switches; switch plates; thermostat covers and controls; telephone handsets; instrument handles; food trays; instrument trays; bedpans; exercise equipment; physical therapy equipment; medical chart holders; laundry hampers; television controls; a computer mouse; a computer keyboard; a personal digital assistant; toothbrush holders; pens; ATM machines; gym lockers; elevator handrails or control buttons; soap holders; soap dispensers; toilet paper dispensers; bracelets; water fountain knobs and/or buttons; kitchen cabinet door handles; microwave handles; refrigerator handles; stove top control buttons; play area equipment; smart phone covers; and vending machines.

11. The method of claim 5, wherein providing a surface comprising a Cu alloy comprises polishing said surface.

* * * * *